L. B. GOBEL.
TRACTION WHEEL.
APPLICATION FILED DEC. 8, 1920.
1,411,692.
Patented Apr. 4, 1922.
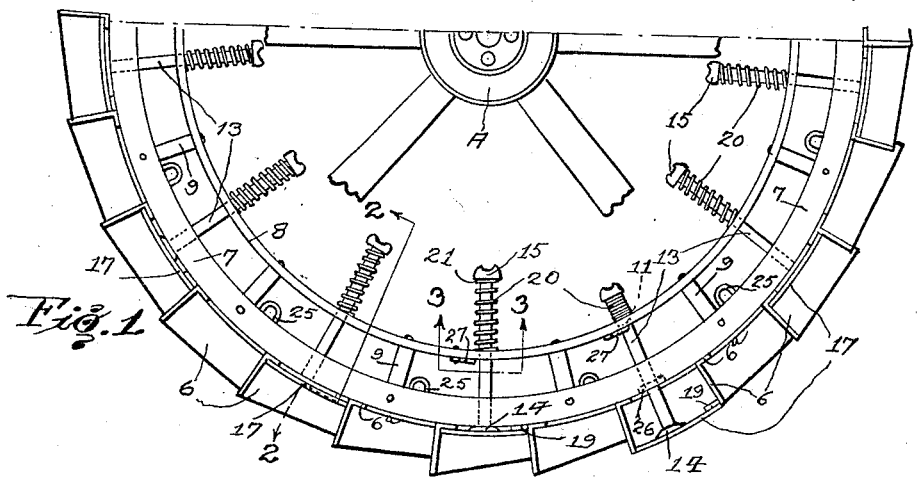
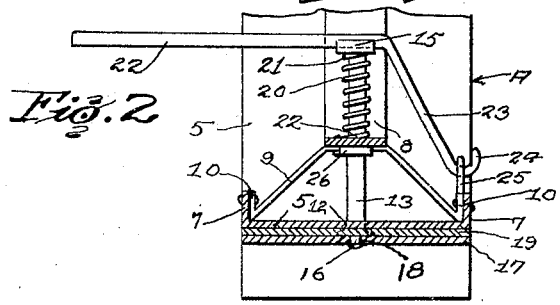
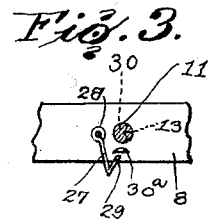
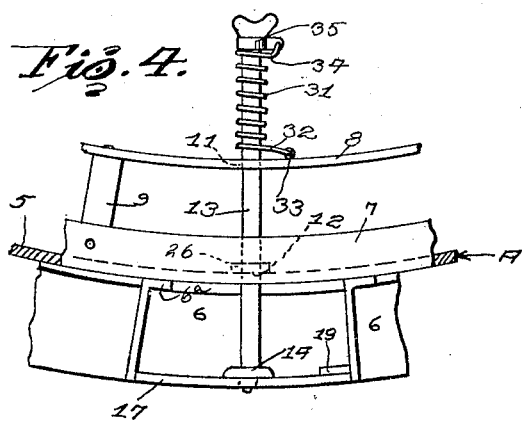
Lewis B. Gobel,
INVENTOR.
BY
Watson E. Coleman
ATTORNEY.

UNITED STATES PATENT OFFICE.

LEWIS B. GOBEL, OF MAYSVILLE, MISSOURI.

TRACTION WHEEL.

1,411,692.    Specification of Letters Patent.    Patented Apr. 4, 1922.

Application filed December 8, 1920. Serial No. 429,120.

*To all whom it may concern:*

Be it known that LEWIS B. GOBEL, a citizen of the United States, residing at Maysville, in the county of Dekalb and State of Missouri, has invented certain new and useful Improvements in Traction Wheels, of which the following is a specification, reference being had to the accompanying drawings.

This invention relates to traction wheels and particularly to an attachment for use in connection with the traction lugs of the wheel.

An object of the invention is to provide an attachment of this character whereby soil that is disposed between the lugs may be readily removed without the loss of time or labor.

Another object of the invention is to provide an attachment of this character which does not require a special make of traction wheel but may be applied to any conventional form of traction wheel using traction lugs.

Another object is to provide a device of this character whereby the attachment may be disposed flush with the ground engaging edges of the lugs so that the traction wheel may be used on hard surfaces such as concrete, asphalt, etc., without danger of the lugs forming indentations, in said surfaces.

Another object is to provide an attachment of this character including a plurality of plates adapted to be disposed between the traction lugs and provided with means for holding said plates in engagement with the rim of the wheel and manually operable at certain times to remove the soil that has accumulated between the lugs.

A still further object of the invention is to provide an attachment of this character wherein the plates are yieldably maintained flush with the ground engaging edges of the traction lugs and depressed by contact with the ground so that when the traction lugs leave the ground the plates automatically remove the soil from between the lugs.

With the above and other objects in view, the invention consists in the improved construction and arrangement of parts to be hereinafter more particularly described, fully claimed and illustrated in the accompanying drawings, in which:—

Figure 1 is a fragmentary side elevation of a tractor wheel showing the invention applied.

Figure 2 is a section taken on the line 2—2 of Figure 1,

Figure 3 is a section taken on the line 3—3 of Figure 1,

Figure 4 is a fragmentary side elevation of another form of the invention.

Referring to the drawings, A designates a conventional form of traction wheel including a rim 5 and spaced traction lugs 6, having the usual supporting flanges 6$^a$. The wheel is also provided with inwardly extending flanges 7. Disposed inwardly of the wheel in annular spaced relation to the intermediate portion of the rim, is an annular support 8, a plurality of braces 9 being secured at their ends 10 to the inner surface of the flanges 7 and secured at their intermediate portion to the support 8, said braces being substantially V-shape so as to properly brace the support from both sides. The support 8 is provided with a plurality of spaced openings 11 which register with similar openings 12 provided in the rim 5 of the wheel.

A plurality of shafts 13 are provided, each shaft being slidably disposed in the registering openings 11 and 12, the outer end 14 of each shaft being enlarged while the inner end is provided with a socket member 15. An extension 16 projects from the end 14, the purpose of which will be hereinafter described. It will be noted that the openings 12 are disposed midway between the spaced traction lugs 6, the end portion 14 of each shaft projecting beyond the periphery of the rim between the lugs.

In order to permit efficient operation of the traction wheel, there is provided a plurality of plates 17 which correspond in width to the width of the rim and in length to the distance between the lugs 6, the lugs serving as guides for the plates. The ends of the plates are constructed in accordance with the position of the lugs on the wheel so as to permit the plates to move between the lugs in a direction toward or away from the wheel. The intermediate portion of each plate is provided with an opening 18 adapted to receive the extension 16 of the shaft and by means of which the plate is secured to the shaft. One end of the plate is provided with a bar 19 to permit the plate to be disposed parallel to the rim of the wheel when the opposite edge of the plate is engaged with the projecting flange 6ª of the adjacent lug 6. By this means the plates 17 cooperate with the shafts 13 to provide plungers for rendering the lug inoperative or for removing the soil.

In order to permit the lugs to engage the ground when the tractor is used in the field or on soft soil, an expansion spring 20 is provided, said spring encircling the inner end of the shaft 13 and having its end 21 engaged with the socket member 15 and its end 22 engaged with the support 8 so as to urge the plate through the medium of the shaft towards and into engagement with the rim 5 of the wheel. When in this position the lugs project in the well known manner so that they will readily penetrate the ground. After the space between the lugs becomes clogged with soil, the same may be readily removed through the medium of a lever 22. The end portion 23 of the lever 22 is extended at right angles to the main portion of the lever while the extremity of the end portion 23 is formed into a hook 24. This hook is adapted to engage an eye 25 which is secured to one of the rims 7, one of said eyes being disposed adjacent each of the shafts 13 while only one operating lever is necessary to operate each of the shafts. After the hook 24 is engaged with the eye 25, the main portion of the lever is engaged with the socket member 15 of the adjacent shaft. When the lever is moved downwardly, the shaft will be forced outwardly, thereby moving the plate towards the outer or ground engaging edges of the lugs, and removing the soil from between the lugs. When the lever is disengaged, the spring forces the plate 17 into engagement with the rim 6. A collar 26 is disposed around the portion of the shaft which is normally positioned between the rim 6 and the support 8 so as to limit the outward movement of the plate and permit the plate to be disposed flush with the ground engaging edges of the lugs 6.

When the traction wheel is used on roads having hard surfaces, or on pavements, the plates 17 are maintained in their extended position, that is with the outer surface of the plates disposed flush with the ground engaging edges of the traction lugs. This is accomplished through the medium of a hook 27 which is substantially V-shaped, the end 28 of the hook being pivoted to the lower surface of the plate 8 while the bill 29 of the hook is adapted to be disposed in an opening 30 provided in the shafts 13, one of the hooks being used in connection with each shaft, the boss 30ª serving as fastening means for the hook. By this means, the tendency of the spring to urge the plates towards the rim is overcome and at the same time the sharp edges of the lugs are prevented from forming indentations in the surface over which the wheel is traveling.

In Figure 4, another form of invention is shown, this form consists in using a retraction spring 31, the end 32 of the spring being secured to an eye 33 carried by the support 8 adjacent the shaft while the end 34 of the spring is secured to a collar 35. With the use of this spring the plates 17 are constantly urged outwardly and are disposed flush with the ground engaging edges of the lugs, the collar 26 limiting the outward movement. With this form of invention, when the plates 17 come in contact with the ground, the weight of the wheel overcomes the resistance of the spring 31 and forces the plates towards the rim 6, thereby permitting the lugs to penetrate the ground and obtain a firm hold. When the lugs leave the ground, the resistance to the spring being removed, the plates are automatically forced outwardly, thereby removing the soil that may have accumulated between the lugs.

The form of invention illustrated in Figures 1 to 3 is particularly adapted for use on traction wheels where the ground is relatively hard and where all resistance to the lugs must be removed. This is possible as the plates are maintained at all times closely adjacent the rim of the wheel but may be moved outwardly to clean the lugs or to close the space between them, through the medium of the lever 22. On the other hand, the form of invention disclosed in Figure 4 is preferable where the ground is relatively soft and where it is necessary to constantly remove the soil from between the lugs in order to prevent interference with the efficient operation of the traction wheel.

From the foregoing it will be readily seen that this invention provides a novel and simple device that may be readily attached to the conventional form of traction wheels as no special form of lugs are necessary, and through the medium of the novel form of braces 7, the support 8 may be readily positioned inwardly of the wheel. In addition to this the device may be regulated to permit efficient operation of the traction wheels on all surfaces both soft, medium and hard, and to efficiently clean the lugs in addition to preventing the lugs from forming indentations in pavements. All of these features are possessed by an attachment that is simple in construction and operation and compact in form.

What is claimed is:—

1. An attachment for traction wheels comprising spaced traction lugs carried by the wheel, shafts slidably mounted in the rim of the wheel, a plate carried by each shaft, said plates being disposed between the lugs, means yieldably urging the plates and shaft towards the wheel, a lever adapted to be detachably engaged with the wheel and the shaft of one of the plates to move said plate away from and in spaced relation to the periphery of the wheel, and means for holding said plate flush with the ground engaging edges of the traction lugs.

2. An attachment for traction wheels comprising spaced traction lugs carried by the wheel, shafts slidably mounted in the rim of the wheel, a plate carried by each shaft, said plate being movable between the lugs and means yieldably urging the plates toward the ground engaging edges of the lugs.

3. An attachment for traction wheels comprising spaced traction lugs carried by the rim of the wheel, spaced shafts movable through the rim of the wheel between the lugs, plates secured to the shafts and extending between the lugs, a socket member on the inner end of each shaft, an eye carried by the rim of the wheel and a lever having one end portion engaged with the eye and the socket member of one of the shafts, whereby the plate of the shaft is moved from the rim of the wheel to the ground engaging edges of the lugs.

4. An attachment for traction wheel comprising an annular support carried by the wheel in spaced relation to the inner surface of the rim, a plurality of spaced traction lugs carried by the outer surface of the rim, a plurality of shafts slidable through the support and the rim, plates carried by the outer ends of the shafts, said plates being movable between the lugs toward and away from the rim of the wheel, a spring disposed between the inner end of the shaft and the support, means for compressing the spring and forcing the plates towards the ground engaging edges of the lugs, and a hook carried by the support and adapted to engage the shaft, whereby the plates are maintained flush with the ground engaging edges of the lugs.

In testimony whereof I hereunto affix my signature.

LEWIS B. GOBEL.